April 21, 1970     H. B. WARNOCK     3,507,359
LUBRICATING SYSTEM

Filed March 27, 1968     2 Sheets-Sheet 2

NC: NORMALLY CLOSED
NO: NORMALLY OPEN

INVENTOR
HOWARD B. WARNOCK

BY Jeffers and Young
ATTORNEYS 3,507,359
LUBRICATING SYSTEM
Howard B. Warnock, Minster, Ohio, assignor to The Minster Machine Company, Minster, Ohio, a corporation of Ohio
Filed Mar. 27, 1968, Ser. No. 716,504
Int. Cl. F16n 29/04
U.S. Cl. 184—6          8 Claims

ABSTRACT OF THE DISCLOSURE

A lubricating system for a machine has a manifold which is supplied with a lubricant. The manifold has a return outlet and one or more lubricating outlets. The return outlet is connected through a return flow switch to a sump, and each lubricating outlet is connected through a lubricating flow switch to the machine. The lubricant from the machine is returned to the sump. The flow switches respectively indicate reduced flow in the return or a reduced flow to the machine.

BACKGROUND OF THE INVENTION

My invention relates to a lubricating system, and particularly to a lubricating system having means for monitoring the flow of lubricant to certain locations in a machine.

Lubrication of machines is a very important factor in the design and operation of the machines. In the case of a power press, for example, proper lubrication permits the press to operate at higher speeds, to operate with greater forces, and to operate for longer times without breakdown or maintenance. In order to provide this proper lubrication, various systems have been devised. One such system is described and shown in U.S. Patent No. 2,688,382 issued Sept. 7, 1954, and entitled "Lubrication Insurance System for Presses." When the systems such as shown in the mentioned patent are functioning properly, the machine or press receives the proper lubrication. However, these systems have several disadvantages. For example, these systems monitor the pressure of the lubricant. If a lubricating line becomes clogged or dented so that there is a reduced lubricant flow, the pressure monitors may still indicate the proper pressure. The operator or the control for the lubrication system receives an indication that the system is operating satisfactorily when actually the machine or bearing may not be receiving the needed flow of lubricant. Or, if a lubricating line has a slight break or opening, the pressure monitors may still indicate the pressure when actually the machine or bearing may not be receiving the needed flow of lubricant.

Accordingly, an object of my invention is to provide a new and improved lubricating system for a machine, such as a press.

Another object of my invention is to provide a more reliable lubricating system that uses devices which indicate the flow of lubricant rather than devices which indicate the pressure of lubricant.

Another object of my invention is to provide a new and improved lubricating system which monitors the flow of lubricant in the system, and which provides an indication in response to reduced lubricant flow in a dented or clogged lubricating line in the system.

Another object of my invention is to provide a new and improved lubricating system which monitors the flow of lubricant in the system, and which provides an indication in response to a break in a lubricating line in the system.

SUMMARY OF THE INVENTION

Briefly, these and other objects are achieved in accordance with my invention by a system having pumping means with an inlet and an outlet. A distribution manifold has its inlet connected to the pumping means outlet, and has a return outlet and one or more lubrication outlets. Return lubrication flow indication means are connected between the manifold return outlet and the pumping means inlet, and bearing flow indication means are connected between selected manifold lubrication outlets and the pumping means inlet. The connection for each bearing flow indication means is adapted to supply lubrication to some bearing or structure of a machine. If a connection between a manifold lubrication outlet and the pumping means inlet becomes restricted or clogged, the bearing flow indication means will indicate a reduction in lubrication flow. If there is a reduction in flow between the pumping means outlet and the manifold inlet, or if there is a loss of lubricant in any line, there will be a reduction of flow between the manifold return outlet and the pumping means inlet. This reduction of flow will be indicated by the return flow indication means. Thus, my system monitors a flow to a machine bearing or structure, and provides an indication when there is loss of flow in any part of the system or when there is loss of flow to the machine bearing or structure. This indication can be used to warn an operator, or can be used to turn the machine off.

BRIEF DESCRIPTION OF THE DRAWING

The subject matter which I regard as my invention is particularly pointed out and distinctly claimed in the claims. The structure and operation of my invention, together with further objects and advantages, may be better understood from the following description given in connection with the accompanying drawing, in which:

DESCRIPTION OF THE PREFERRED EMBODIMENT

Figure 1:
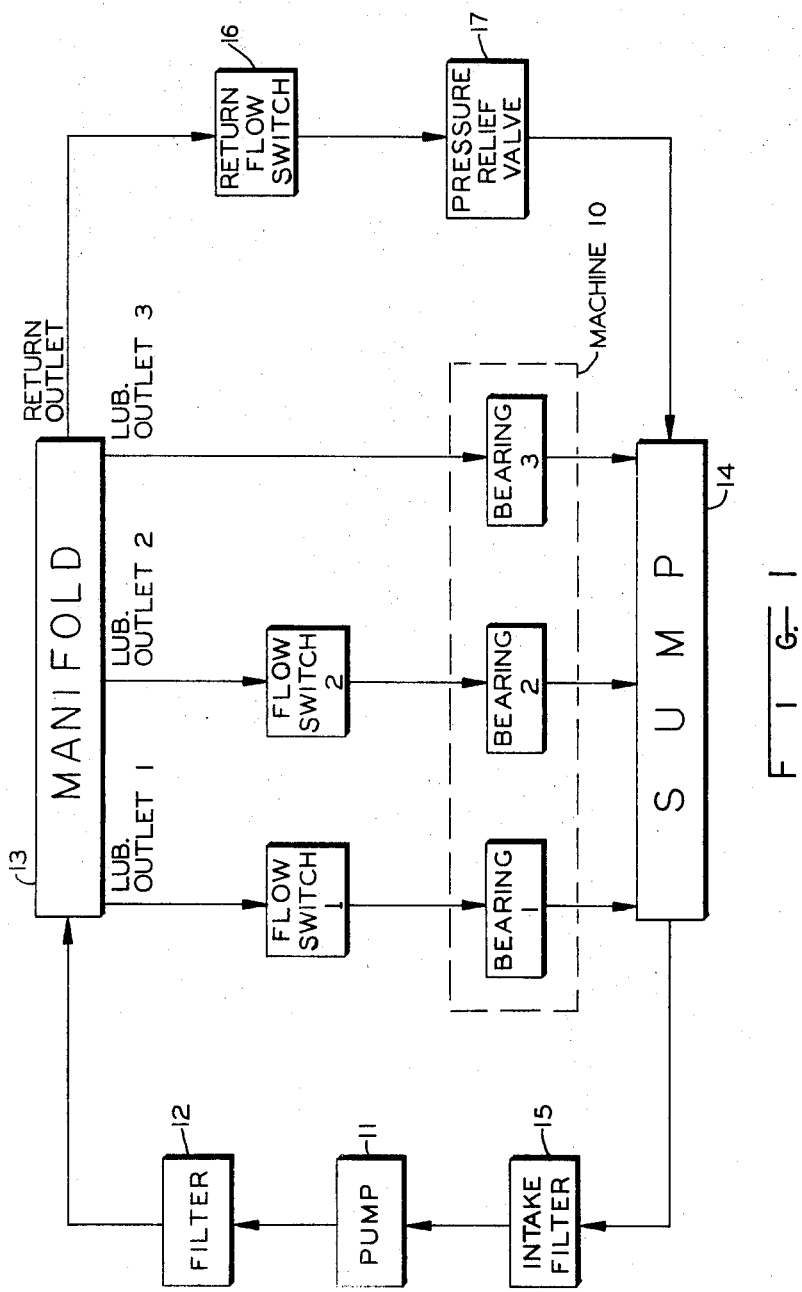
FIGURE 1 shows a diagram of one embodiment of a lubricating system in accordance with my invention.

One embodiment of my lubricating system is shown in the diagram of FIGURE 1. In FIGURE 1, it has been assumed that a machine 10, indicated by the dashed line rectangle, has three bearings 1, 2, and 3. The bearings 1 and 2 are assumed to be important or critical, so that the flow of lubricant to these bearings 1 and 2 is monitored. The bearing 3 is assumed to be less critical or important, so that if lubricant does not flow to the bearing 3, its loss will not be critical, or its replacement will be simple. The lubrication system has a pump or pumping means 11 of suitable size and capacity, larger than that required by the bearings 1, 2, and 3. The outlet of the pump 11 is connected through a filter 12 to the inlet of a distribution manifold 13. The manifold 13 has three lubrication outlets 1, 2, and 3, and a return outlet as indicated. The lubrication outlets 1 and 2 are respectively connected to the inlets of flow switches 1 and 2. The outlets of the flow switches 1 and 2 are respectively connected to the bearings 1 and 2 of the machine 10. The lubrication outlet 3 is connected directly to the bearing 3 of the machine 10. The connection between the flow switches 1 and 2 and the bearings 1 and 2 and the connection between the lubrication outlet 3 and the bearing 3 may have suitable orifices which provide the desired flow of lubricant. A connection is provided between the bearings 1, 2, and 3 and a collection point or sump 14. This connection may be completely closed, or may simply be a collection pan or other device for returning the lubricant to the sump 14. The return outlet of the manifold 13 is preferably positioned at the most remote location relative to the manifold inlet, so that the return outlet is at the lowest pressure point in the manifold 13. The return outlet is connected to the inlet of a return flow switch 16, and the outlet of the return flow switch 16 is connected through a pressure relief valve 17 to the sump 14. The pressure relief valve 17 is provided to set the system pressure at any desired level. The pressure relief valve 17 is preferably positioned immediately adjacent the return flow switch 16 on the downstream side. The return flow switch 16 and the pressure relief valve 17 are preferably positioned immediately adjacent the sump 14 on the upstream side. The sump 14 is usually open to the atmosphere. A line is connected from an outlet of the sump 14 through an intake filter 15 back to the inlet of the pump 11 for supplying lubricant to the pump 11.

While I have shown a manifold 13 with only three lubrication outlets, two of which are connected to respective flow switches, it is to be understood that the manifold 13 may have any desired number of lubrication outlets. Any or all of these lubrication outlets may be provided with flow switches for the respective bearings or other points which require lubrication. The exact number and arrangement of the lubrication outlets and flow switches will depend upon the exact arrangement of the machine and its bearings or members which require lubrication.

Figure 2:
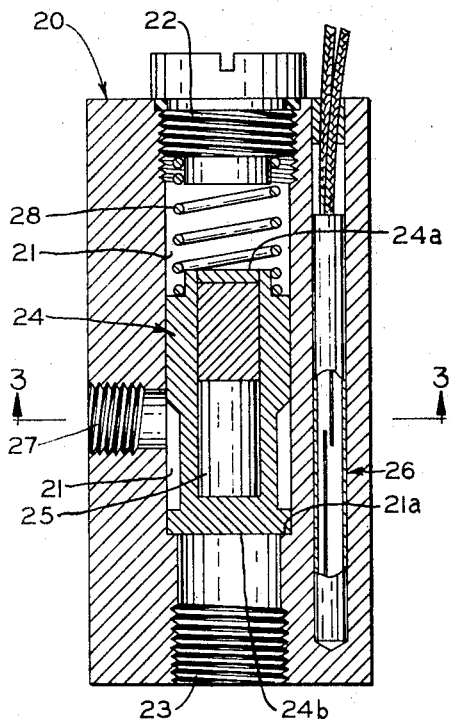
FIGURE 2 shows a longitudinal cross sectional view of a flow switch which can be utilized with my lubricating system, the view of FIGURE 2 being taken along the line 2—2 in FIGURE 3.
Figure 3:
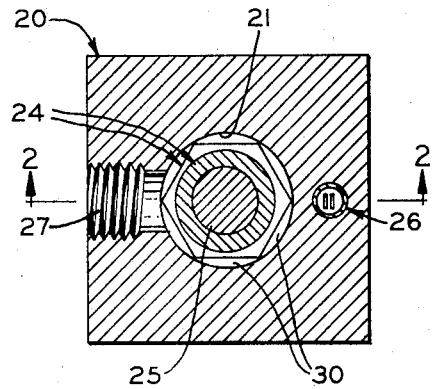
FIGURE 3 shows a transverse cross sectional view of the flow switch of FIGURE 2, the view of FIGURE 3 being taken along the line 3—3 in FIGURE 2.

The flow switches shown in FIGURE 1 are responsive to flow, as opposed to pressure, of lubricant. Such flow switches are known in the art, and FIGURES 2 and 3 show one example of a flow switch. With respect to FIGURES 2 and 3, the flow switch has a suitable housing 20 made of a nonmagnetic material such as brass. The housing 20 has a longitudinal circular cylinder 21 which is closed at one end such as by a threaded screw 22. The other end of the cylinder 21 is threaded to serve as an inlet end 23. A piston 24 is slidingly positioned in the cylinder 21. A compression spring 28 is positioned in the cylinder 21 between the screw 22 and one end 24a of the piston 24 to normally urge the piston 24 downward so that its other end 24b rests against a seat or flange 21a in the cylinder 21. The piston 24 carries a permanent magnet 25. The position of the permanent magnet 25 determines the condition of the contacts of a conventional magnetic reed switch 26. The flow switch has an outlet 27 which is a threaded opening extending transversely from one side of the housing 20 into the cylinder 21. In the absence of flow of lubricant between the inlet 23 and the outlet 27, the piston 24 occupies the position shown in FIGURE 2 with its lower end 24b resting against the circular flange or seat 21a adjacent the inlet 23. In FIGURE 3, it will be noted that the piston 24 has a cross sectional configuration such that spaces or openings 30 are provided between the outer surface of the piston 24 and the cylinder 21. This permits the lubricant to flow into or reach the area of the cylinder 21 containing the spring 28.

When the flow switch is used, the oil or lubricant which flows into the inlet 23 produces a force against the end 24b of the piston 24 to push the piston 24 against the spring 28 so that the oil or lubricant can flow out of the outlet 27. This oil also flows through the spaces 30 past the piston 24 into the area containing the spring 28. As long as the lubricant continues to flow, it urges the piston 24 upward against the spring 28 toward the screw 22. This cuases the magnet 23 to be moved upward in closer relation to the contacts of the reed switch 26 so that these contacts become closed. However, if the oil flow is reduced below a certain level, determined among other things by the compression force of the spring 28, the piston 24 moves downward so that its end 24b rests on the seat or flange 21a adjacent the inlet 23. This moves the permanent magnet 25 away from the contacts of the reed switch 26 so that the contacts thus open. The flow switch of FIGURES 2 and 3 can provide an indication of almost any rate of flow by the condition of the contacts of the reed switch 26.

Figure 4:
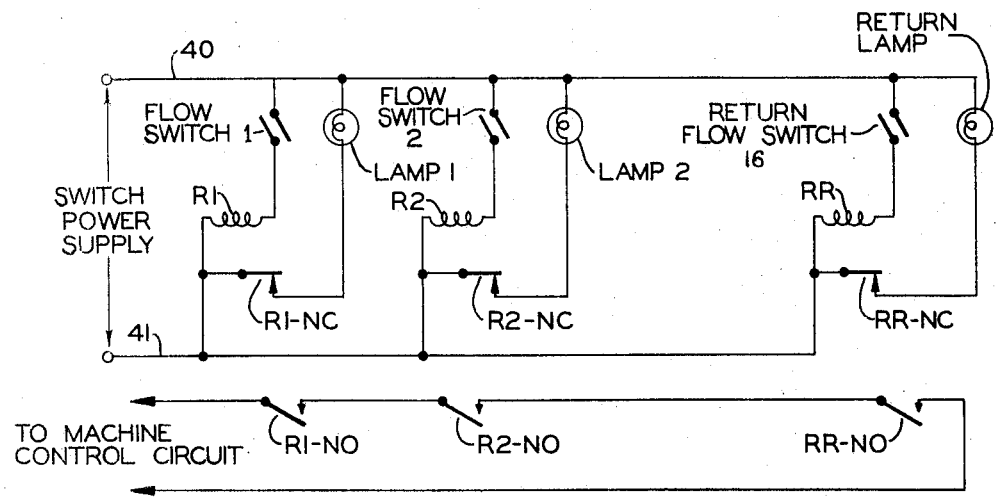
FIGURE 4 shows an electrical diagram of one arrangement which can be used with the lubricating system shown in FIGURE 1.

FIGURE 4 shows one electrical diagram which can be used with the lubrication system shown in FIGURE 1. In the diagram of FIGURE 4, it has been assumed that it is desired to turn hte machine 10 off in the event of a break or stoppage in the lubrication lines, and to indicate by means of a light or similar device, when there is a reduction of flow in any of the flow switches. A suitable switch power supply, such as 24 volts, 60 cycles alternating current, is provided on buses 40, 41. The contacts of each flow switch are respectively connected in series with a relay winding (indicated by the letter R followed by a numeral or the letter R) between the buses 40, 41. Each relay winding has a set of normally closed contacts indicated by the relay winding designation followed by the letters NC. Each of the relay windings also has a set of normally open contacts indicated by the relay winding designation followed by the letters NO. The normally closed relay contacts are respectively connected in series with an indicator lamp between the buses 40, 41. The normally open relay contacts are connected in series with each other, and this series circuit is connected to a suitable control circuit for the machine 10. This control circuit may be in the main power supply for the machine 10 so that if any one of the normally open relay contacts does open, the machine 10 is turned off.

The operation of the lubrication system of FIGURE 1 will be described in connection with the electrical circuit of FIGURE 4. When the machine 10 is to be operated, the buses 40, 41 of FIGURE 4 are energized. If the pump 11 is turned off, the flow switches are all in their closed position so that their respective contacts are open. Hence, the relay windings R1, R2, RR are de-energized, the normally closed contacts R1–NC, R2–NC, RR–NC are closed, and the normally open contacts R1–NO, R2–NO, RR–NO are open. This is the condition illustrated in FIGURE 4. All of the indicating lamps should be energized and illuminated. If a lamp is not illuminated, it indicates that the lamp has burned out, or that there is something wrong with the electrical circuit, or that one of the flow switches is malfunctioning. However, if all of the lamps are illuminated, the pump 11 may then be turned on. As the lubricant begins to flow, each of the flow switches will be operated so that their respective contacts will close. As the contacts of each flow switch close, the respective relay winding will be energized. When the relay windings become energized, the normally closed contacts R1–NC, R2–NC, RR–NC will open so that their respective lamps will turn off; and the normally open contacts R1–NO, R2–NO, RR–NO will close so that the series circuit is closed and the machine 10 may be turned on. The machine 10 may then be operated with the assurance that the bearings are receiving proper lubrication.

First, assume that one of the lines between the manifold lubrication outlets 1 or 2 or the return outlet and between the sump 14 become clogged or stopped. The particular flow switch associated with the clogged or stopped line will operate to open its contacts. When the contacts of the particular flow switch open, the associated relay winding becomes de-energized. This causes the normally open relay contacts to open, and causes the normally closed relay contacts to close. Opening of the normally open relay contacts causes the machine control circuit to open and stop the machine 10, and closing of the normally closed relay contacts illuminates the light to indicate the particular line which is clogged or stopped. Thus, the machine 10 is stopped before the bearing is damaged, and an indication is provided to assist in locating the trouble.

Then, assume that any one of the lines associated with the system of FIGURE 1 becomes broken so that oil leaks out or is lost. This leakage or loss will cause a reduction in flow between the manifold return outlet and the sump 14. This reduced flow can be caused by the return outlet receiving less oil since it is at the lowest pressure point on the manifold 13, or by the pressure relief valve 17 closing because of a loss of system pressure. With a reduced flow in this line, the return flow switch 16 operates so that its contacts open. This causes the relay winding RR to be de-energized so that its normally closed contacts RR–NC close and so that its normally open contacts RR–NO open. Thus, the machine 10 is turned off and the return lamp is illuminated to indicate that there is a loss of flow. If the leakage or loss occurs between one of the lubrication outlets and its respective flow switch, then that flow switch will also operate so that its contacts open and de-energize its respective relay winding. This will indicate the specific line that is leaking or open. If the leakage or loss occurs elsewhere in the system, the bearings continue to receive lubricant, and the return flow switch 16 will operate and turn the machine 10 off before any bearings are damaged. While this loss or leakage is not specifically indicated as to the line, an operator will know that there is a loss of flow and look for oil leaking at some location.

It will thus be seen that my lubricating system provides a new and improved system for providing lubrication to a machine, and for indicating stoppage of lubrication or loss of lubrication. And, my system utilizes flow switches which are responsive to flow rather than pressure, so that a more reliable and useful indication is provided. While I have shown only one specific embodiment of my invention, persons skilled in the art will appreciate that modifications may be made. For example, with reference to FIGURE 1, the bearing 3 may be provided with a flow switch. Likewise, additional bearings may be provided with lubrication lines and flow switches, and additional bearings may be provided with unmonitored lubrication lines without flow switches. Also, different electrical circuits may be provided. Solid state, as opposed to relay, circuits may be used. If only an indication of leakage or stoppage is needed, an operator can respond to a visual or audible indication and turn the machine off manually, rather than have the machine turn off automatically. While I prefer that the bearing flow switches be as near the bearings as possible to monitor the flow in as much line as possible, the switches may be near the manifold 13 if desired. While I prefer that the return flow switch and relief valve be positioned as near the sump as possible, they may also be positioned near the manifold. I prefer to use the relief valve although it may be omitted if the return line does not take too much lubricant from the bearings. The flow switches may be of any suitable type. While I prefer that the pump 11 supply about twice the needed bearing flow, this capacity may be increased or decreased. Finally, the lubrication system may be provided for any type of device or machine other than simply bearings on a machine such as a press. For example, the lubrication may be provided for cutting or cooling in a machining operation. Therefore, while my invention has been described with reference to a particular embodiment, it is to be understood that modifications may be made without departing from the spirit of the invention.

What I claim as new and desire to secure by Letters Patent of the United States is:

1. An improved system for lubricating a bearing of a machine such as a press, comprising:
   (a) lubrication pumping means having an inlet and an outlet;
   (b) a distribution manifold having an inlet connected to said pumping means outlet, and further having a return outlet and at least one lubrication outlet;
   (c) return lubrication flow indication means having an inlet and an outlet, and having associated means for indicating a predetermined rate of lubrication flow between said inlet and outlet of said return flow indication means and for indicating a lack of said predetermined rate of lubrication flow between said inlet and outlet of said return flow indication means;
   (d) first means connecting said return flow indication means inlet to said manifold return outlet and connecting said return flow indication means outlet to said pumping means inlet;
   (e) bearing flow indication means having an inlet and an outlet, and having associated means for indicating a predetermined rate of lubrication flow between said inlet and outlet of said bearing flow indication means and for indicating a lack of said predetermined rate of lubrication flow between said inlet and outlet of said bearing flow indication means;
   (f) and second means connecting said bearing flow indication means inlet to said manifold lubrication outlet and connecting said bearing flow indication means outlet to said pumping means inlet;
   (g) said second connecting means being adapted to supply lubrication to a bearing of a machine.

2. The improved lubricating system of claim 1 and further comprising a pressure relief valve connected in said first connecting means to maintain the pressure of said system at a selected level.

3. The improved system of claim 1 and further comprising electrical means coupled to said associated means of said return flow indication means and to said associated means of said bearing flow indication means for indicating a lack of said predetermined rate of lubrication flow.

4. The improved lubricating system of claim 3 and further comprising a pressure relief valve connected in said first connecting means to maintain the pressure of said system at a selected level.

5. An improved system for lubricating selected areas in a machine such as a press, comprising:
   (a) a manifold having an inlet, a lubrication outlet for each selected area of a machine to be lubricated, and a return outlet;
   (b) a lubrication sump having an outlet;
   (c) a lubrication pump having an inlet connected to said sump outlet and having an outlet connected to said manifold inlet;
   (d) a return flow switch having a lubrication inlet connected to said manifold return outlet, said return flow switch having a lubrication outlet and an electrical circuit responsive to lubrication flow in said return flow switch;
   (e) a pressure relief valve connecting said return flow switch outlet to said sump;
   (f) a lubrication flow switch having an inlet respectively connected to each of said manifold lubrication outlets, each lubrication flow switch having a lubrication outlet and an electrical circuit responsive to lubrication flow in said lubrication flow switch;
   (g) means connecting each lubrication flow switch outlet to a respective one of said selected areas in said machine;
   (h) means connecting each of said selected areas in said machine to said sump;
   (i) and a utilization circuit connected to each of said electrical circuits of said flow switches.

6. The improved lubricating system of claim 5 wherein said utilization circuit comprises an indicating means for each of said flow switches, and comprises means for stopping said machine in response to an indication by any one of said flow switches.

7. The improved system of claim 5 wherein said lubrication pump and said pressure relief valve are arranged so that said lubrication pump maintains a pressure in said system at least as great as the pressure determined by said pressure relief valve.

8. The improved lubricating system of claim 7 wherein said utilization circuit comprises an indicating means for each of said flow switches, and comprises means for stopping said machine in response to an indication by any one of said flow switches.

References Cited

UNITED STATES PATENTS

| | | | |
|---|---|---|---|
| 1,013,180 | 1/1912 | Key | 184—6 |
| 1,150,485 | 8/1915 | Bentley | 184—6 |
| 1,289,903 | 12/1918 | Pogue. | |
| 2,502,318 | 3/1950 | Fischer | 184—6 |
| 2,688,382 | 9/1954 | Georgeff | 184—6 |
| 3,270,836 | 9/1966 | Rickley | 184—6 |
| 3,300,769 | 1/1967 | Batur | 340—270 |
| 3,381,776 | 5/1968 | Gruber et al. | 184—6 |

MARK M. NEWMAN, Primary Examiner

M. A. ANTONAKAS, Assistant Examiner

U.S. Cl. X.R.

340—270